United States Patent [19]

Royer

[11] Patent Number: 4,531,267
[45] Date of Patent: Jul. 30, 1985

[54] METHOD FOR FORMING A PRESSURE SENSOR

[75] Inventor: Michele Royer, Minneapolis, Minn.
[73] Assignee: Honeywell Inc., Minneapolis, Minn.
[21] Appl. No.: 552,878
[22] Filed: Jan. 26, 1984

Related U.S. Application Data

[62] Division of Ser. No. 363,693, Mar. 30, 1982, Pat. No. 4,445,384.

[51] Int. Cl.³ .......................................... H01L 41/22
[52] U.S. Cl. .................................. 29/25.35; 310/324; 361/283
[58] Field of Search ................. 29/25.35, 427; 73/724, 73/723, DIG. 4, 717, 718, 720; 310/366, 330, 324; 361/283

[56] References Cited

U.S. PATENT DOCUMENTS

| | | | |
|---|---|---|---|
| 2,614,416 | 10/1952 | Hollmann. | |
| 2,967,957 | 1/1961 | Massa. | |
| 3,495,105 | 2/1970 | Shimano | 310/366 |
| 3,940,974 | 2/1976 | Taylor | 23/88.5 R |
| 3,943,388 | 3/1976 | Massa | 310/324 X |
| 4,060,729 | 11/1977 | Byer et al. | 250/338 |
| 4,370,583 | 1/1983 | Ljung | 310/331 |
| 4,376,919 | 3/1983 | Konno et al. | 331/158 |

OTHER PUBLICATIONS

P. L. Chen, R. S. Muller, R. M. White, R. Jolly, "Thin Film ZnO-MOS Transducer with Virtually DC Response," IEEE 1980 Ultrasonics Symposium.

Frank Massa, "Low-Cost Transducer Opens Up New Uses," May 27, 1960; Electronics, 128–130.

Craig S. Sander, James W. Knutti, James D. Meindl, "A Monolithic Capacitive Pressure Sensor with Pulse-Period Output," May, 1980; IEEE Transactions on Electron Devices, vol. ED-27, No. 5, 927–930.

Primary Examiner—Howard N. Goldberg
Assistant Examiner—Timothy V. Eley
Attorney, Agent, or Firm—John P. Sumner

[57] ABSTRACT

A pressure sensor comprising a piezoelectric material formed in a geometry which provides a piezoelectric output signal when subjected to a pressure. The piezoelectric material also has a pyroelectric output signal. The present sensor further comprises conductive contacts having a geometry for enhancing the piezoelectric output signal and for substantially eliminating the pyroelectric output signal.

1 Claim, 6 Drawing Figures

METHOD FOR FORMING A PRESSURE SENSOR

This is a division of application Ser. No. 363,693, filed Mar. 30, 1982, now U.S. Pat. No. 4,445,384.

BACKGROUND OF THE INVENTION

The present invention is a piezoelectric pressure sensor comprising a material having both a piezoelectric and pyroelectric output signal. The sensor further comprises electrical contacts having a geometry for enhancing the piezoelectric output signal of the sensor and for substantially eliminating the pyroelectric output signal. Although the sensor is disclosed as a zinc oxide (ZnO) on silicon diaphragm structure, the invention is not limited to such a structure.

Silicon diaphragms have been used in a variety of pressure sensor devices such as capacitive pressure sensors and piezoresistive pressure sensors; see, for example, C. S. Sander, J. W. Knutti, J. D. Meindl, IEEE Trans. Ed. 27, No. May 5, 1980. The use of silicon as part of a sensing element is especially attractive since it allows the silicon diaphragm and the electronic part of the device to be integrated on the same silicon substrate. Such a structure increases the accuracy and the stability of the device and lowers its cost. Further, etching techniques enable the making of thin diaphragms which increase the pressure sensitivity of such devices.

ZnO is a piezoelectric material which can be sputtered on a variety of substrates including silicon and metals, and ZnO can be used as the active element of such a pressure sensor; see, for example, P. L. Chen, R. S. Muller, R. M. White, R. Jolly, IEEE 1980 Ultrasonic Symposium.

When a silicon substrate on such a device is flexed, a stress pattern appears in the ZnO layer and induces a piezoelectric polarization parallel to the 3 axis of the ZnO lattice, which is perpendicular to the surface of the layer. A voltage output can be then collected across a capacitor formed by two electrodes deposited at the top and the bottom surfaces of the ZnO layer. Such a capacitive arrangement, however, typically presents the disadvantage of having to connect the top electrode to the electronics on the silicon substrate, thus involving a step coverage problem, especially in the case of thick ZnO layers on the order of 10 microns in thickness.

The other problem involved in using ZnO as the active element arises from the pyroelectric properties of ZnO, which produces a voltage output due to temperature variations.

The present sensor comprises an electrode configuration which not only solves the two problems mentioned above but also enhances the piezoelectric output signal from the sensor. Thus, the electrode configuration of the present sensor has three technical advantages over prior art piezoelectric pressure sensors. The electrode configuration of the present sensor eliminates the need to connect the top capacitive electrode to the electronics on the semiconductor substrate, thus eliminating a step coverage problem. In addition, the electrode configuration of the present sensor substantially eliminates the pyroelectric voltage output due to temperature variations. Further, the electrode configuration of the present sensor enhances the piezoelectric output signal generated by the piezoelectric sensing material in the sensor.

SUMMARY OF THE INVENTION

The present invention is a pressure sensor comprising a piezoelectric material formed in a geometry which provides a piezoelectric output signal when subjected to a pressure. The piezoelectric material also has a pyroelectric output signal. The present sensor further comprises conductive contacts having a geometry for enhancing the piezoelectric output signal and for substantially eliminating the pyroelectric output signal.

DESCRIPTION OF THE PREFERRED EMBODIMENT

Figure 1:
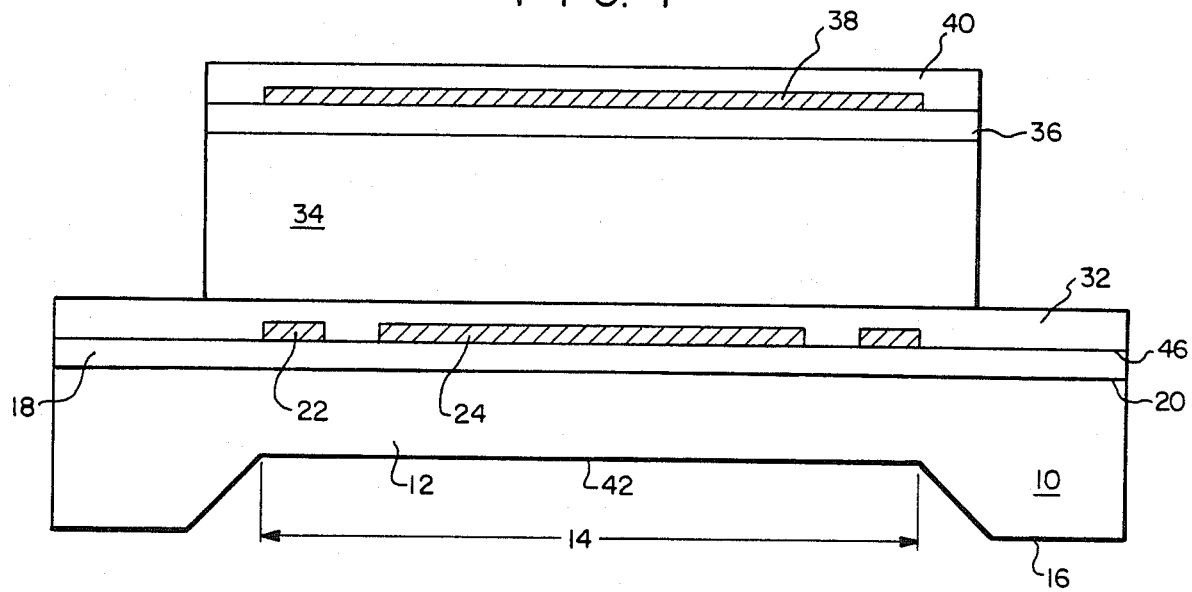
FIGS. 1, 2, and 3 illustrate the structure and electrode configuration of the present sensor.
Figure 2:
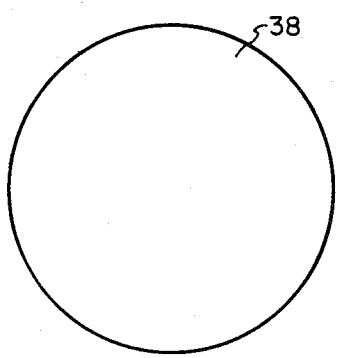
Figure 3:
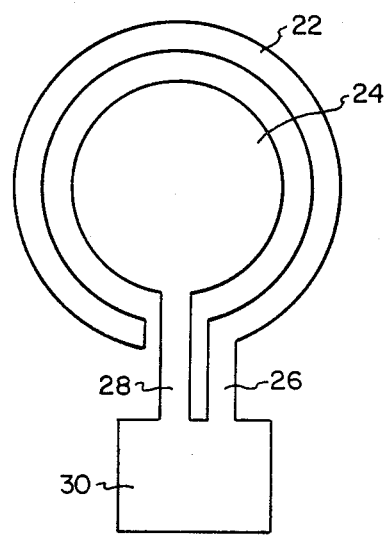

A preferred embodiment of the present sensor comprises a silicon semiconductor body 10 having a diaphragm 12 etched into the body, the diaphragm having a diameter 14. Diaphragm 12 may be etched into body 10 through standard isotropic electrochemical etching from surface 16. Semiconductor or substrate 10 is typically on the order of 250 microns thick.

The present sensor further comprises a layer 18 of dielectric such as silicon dioxide, dielectric layer 18 being formed on a surface 20 of substrate 10. For the preferred embodiment illustrated, the dielectric layer is on the order of one micron in thickness.

A pair of electrodes comprising an outer ring electrode 22 and a center electrode 24 are formed on a surface 46 of dielectric layer 18. In the embodiment illustrated, electrodes 22 and 24 are concentric and are of approximately equal surface area. In other embodiments of the present invention, electrodes 22 and 24 would not have to be round or concentric. For example, they could be of a square configuration. Electrodes 22 and 24 comprise leads 26 and 28, respectively, leading to support electronics 30, which are typically integrated on substrate 10.

The present sensor further comprises a layer 32 of dielectric such as silicon dioxide formed over contacts 22 and 24 and dielectric layer 18.

A layer 34 of piezoelectric material is typically formed above dielectric layer 32. In the preferred embodiment of the present sensor, layer 34 comprises ZnO.

Layer 34 is typically covered with a dielectric layer 36 on top of which is typically formed an electrode 38. In the embodiment shown, electrode 38 is round and has approximately the same diameter as diaphragm 12 and the outer diameter of outer ring electrode 22. As indicated with respect to electrodes 22 and 24, electrode 38 would not have to be round.

A layer 40 of dielectric such as silicon dioxide is typically formed above electrode 38 and dielectric layer 36.

Dielectric layers 32 and 36 isolate piezoelectric layer 34 from electrodes 22, 24, and 38 and, together with dielectric layers 18 and 40, encapsulate the electrodes and leads 26 and 28. Layers 32 and 36 effectively reduce charge leakage into piezoelectric layer 34 and, therefore, effectively retards the cancellation of piezoelectric charge in layer 34.

The present sensor illustrated is typically fabricated by selecting a silicon substrate 10 having proper crystallographic orientation. Integrated support electronics 30 are implanted or otherwise fabricated onto substrate 10. Substrate 10 is then covered with layer 18 of silicon dioxide. As previously indicated, layer 18 is typically on the order of one micron in thickness. A layer of aluminum typically on the order of 0.5 micron in thickness is then deposited above layer 18, and the aluminum is selectively etched to form electrodes 22 and 24. Layer 32 of silicon dioxide is then sputtered down over contacts 22 and 24 and layer 18. The thickness of layer 32 above electrodes 22 and 24 is typically on the order of 0.2 micron in thickness. Layer 34 of ZnO is then sputter-deposited above layer 32, layer 34 typically being in the range of approximately 3–10 microns in thickness. Layer 36 of dielectric is then sputter-deposited above layer 34, layer 36 typically being 0.2 micron in thickness. A layer of aluminum, typically 0.5 micron in thickness, is then sputter-deposited above layer 36. Aluminum layer 38 is then selectively etched to define electrode 38. Layer 40 of silicon dioxide is then sputter-deposited above electrode 38 and dielectric layer 36, layer 40 typically having a thickness above electrode 38 of 0.2 micron. Layers 40, 36, and 34 are then selectively etched to size and the edges of ZnO layer 34 are sputter-deposited with silicon dioxide. Diaphragm 12 is then selectively etched from surface 16 of semiconductor body 10 through isotropic electrochemical etching techniques.

Figure 4:
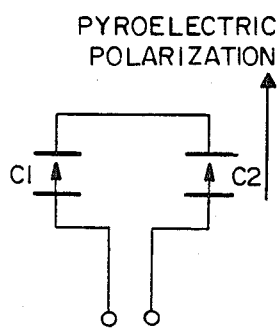
FIGS. 4, 5 and 6 relate to operation of the present sensor.
Figure 6:
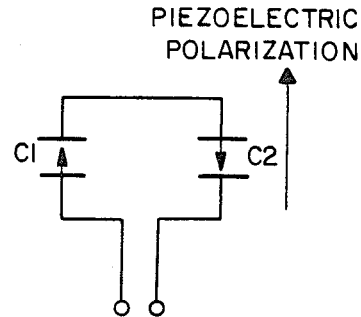

The present sensor comprises two ZnO piezoelectric capacitors C1 and C2, which are schematically illustrated in FIGS. 4 and 6. One of the capacitors C1 and C2 is formed by center electrode 24 and electrode 38, and the other of these capacitors is formed by outer ring electrode 22 and electrode 38. The two capacitors are connected in series through electrode 38. Connections to electronics 30 integrated within silicon substrate 10 are made only with the pair of electrodes 22 and 24 via leads 26 and 28 respectively. As previously indicated, this provides a substantial advantage to the present sensor since no connections need to be made to upper electrodes 38, thus avoiding a step coverage problem in trying to made leads which would connect to upper electrode 38.

ZnO is not only a piezoelectric material, but also has pyroelectric properties. The pyroelectrically induced polarization is perpendicular to the ZnO layer surface and can be assumed to be uniform in all of layer 34. The pyroelectric polarizations induced in capacitors C1 and C2 are shown in FIG. 4. By properly choosing the electrode areas, the pyroelectric outputs of the two capacitors C1 and C2 can be made to cancel each other out. Roughly, this means that, if edge effects of the capacitors are neglected, center electrode 24 and outer ring electrode 22 are of equal surface area.

Figure 5:
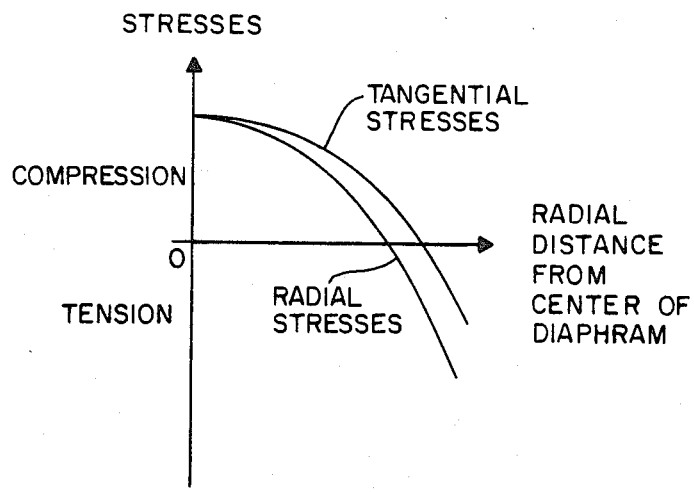

When diaphragm 12 is flexed under a uniform pressure, the stress pattern that develops in the ZnO layer is shown in FIG. 5. When the pressure is applied from the layer 34 side of diaphragm 12, the central part of layer 34 is in compression while the outer part of layer 34 is in extension.

The piezoelectric polarizations induced in capacitors C1 and C2 are shown in FIG. 6. The piezoelectric signals add to one another in the present sensor, thus increasing the pressure sensitivity of the device over sensors in the prior art. The piezoelectric output can be computed by integrating the local piezoelectric signal over the electrode area, and the electrode dimensions can be optimized to obtain a maximum piezoelectric response while satisfying the equal area condition necessary to the cancellation of the pyroelectric responses.

In a preferred embodiment of the present sensor, electrode 38, diaphragm 12, and the outer diameter of outer ring electrode 22 had a diameter of 3.18 millimeters. The inner diameter of outer electrode 22 was 2.38 millimeters, and the diameter of central electrode 24 was 2.1 millimeters. Diaphragm 12 had a thickness between surface 42 and surface 20 of approximately 30 microns.

The present invention is to be limited only in accordance with the scope of the appended claims, since others skilled in the art may devise other embodiments still within the limits of the claims. For example, although typical construction and dimensions have been disclosed, the present sensor is not limited to such construction and dimensions.

The embodiments of the invention in which an exclusive property or right is claimed are defined as follows:

1. A method of forming a pressure sensor, comprising:
    providing a semiconductor body having a first surface and a second surface;
    forming a pair of electrodes encapsulated in dielectric onto the first surface;
    forming a layer comprising piezoelectric material onto the dielectric encapsulating the pair of electrodes, the layer having a first surface in contact with the dielectric and a second surface;
    forming an electrode encapsulated in dielectric onto the second surface of the layer; and
    etching a portion of the semiconductor body from the second surface of the semiconductor body in order to form a diaphragm in the semiconductor body.

* * * * *